Figure 1:
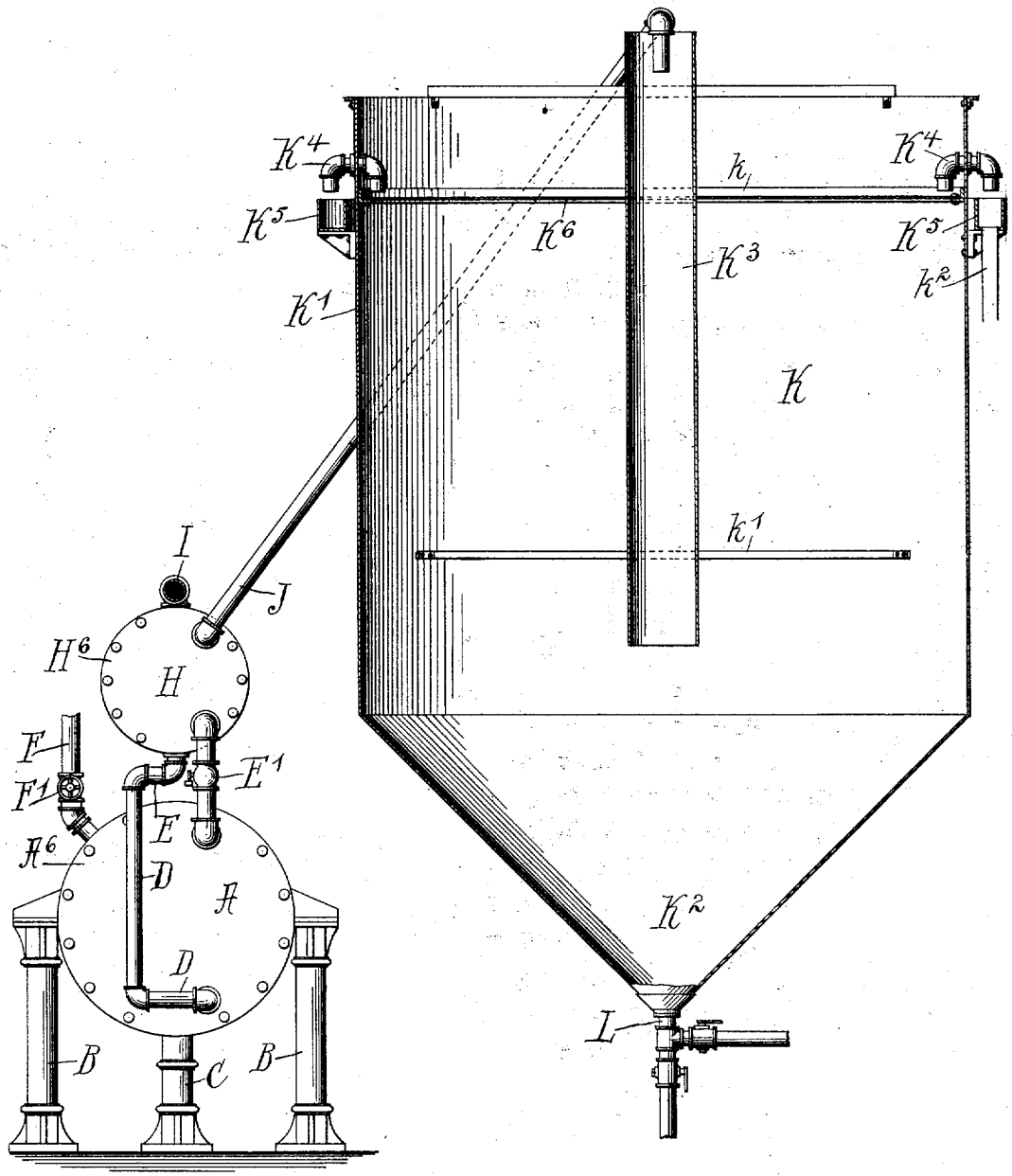

(No Model.) 3 Sheets—Sheet 1.
E. W. DEMING.
PROCESS OF AND APPARATUS FOR DEFECATING SACCHARINE SOLUTIONS.
No. 531,460. Patented Dec. 25, 1894.

Witnesses
Jno. W. Adams
Louis M. T. Whitehead

Inventor
Eugene W. Deming
by Dayton Poole & Brown,
his Attorneys.

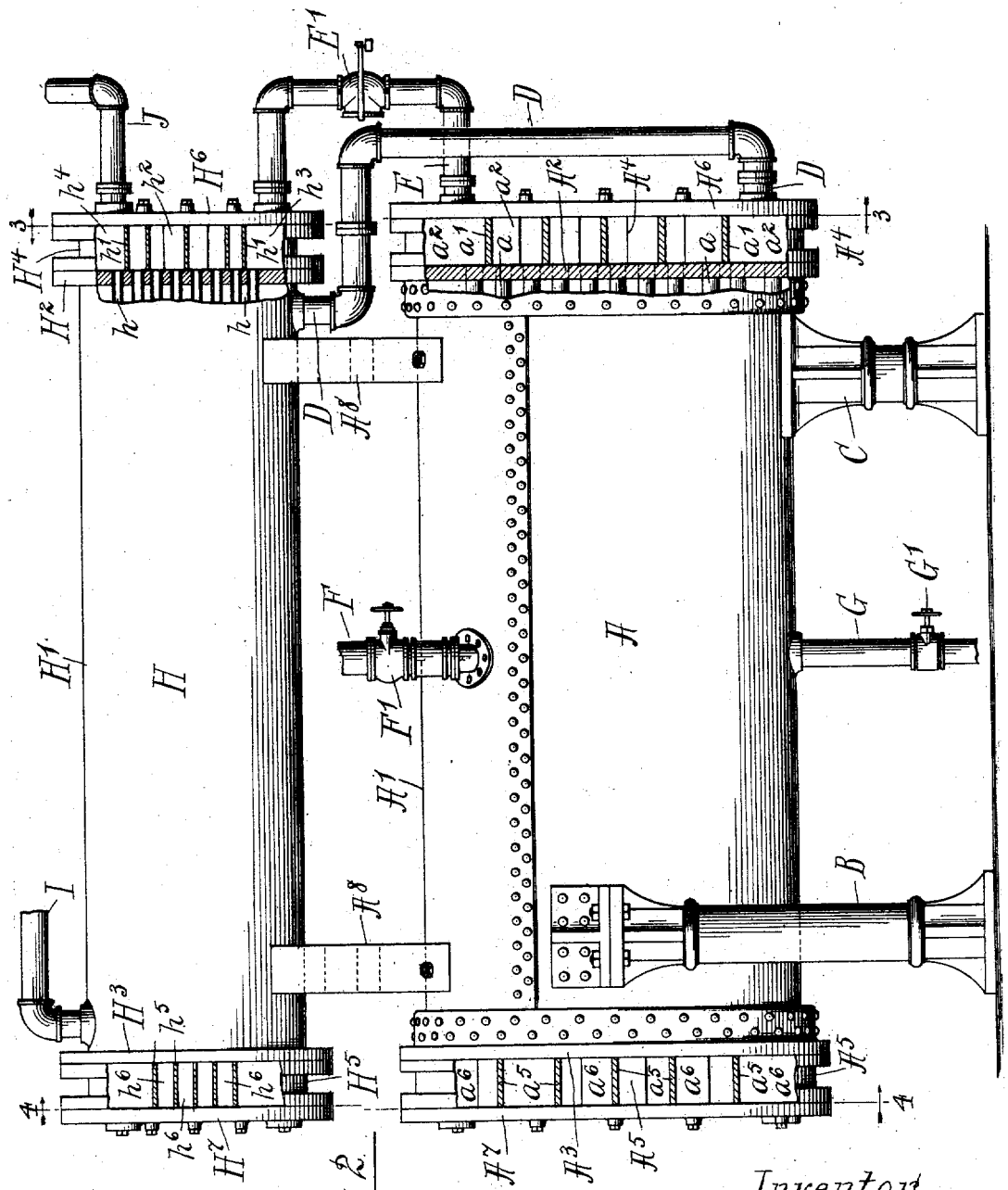

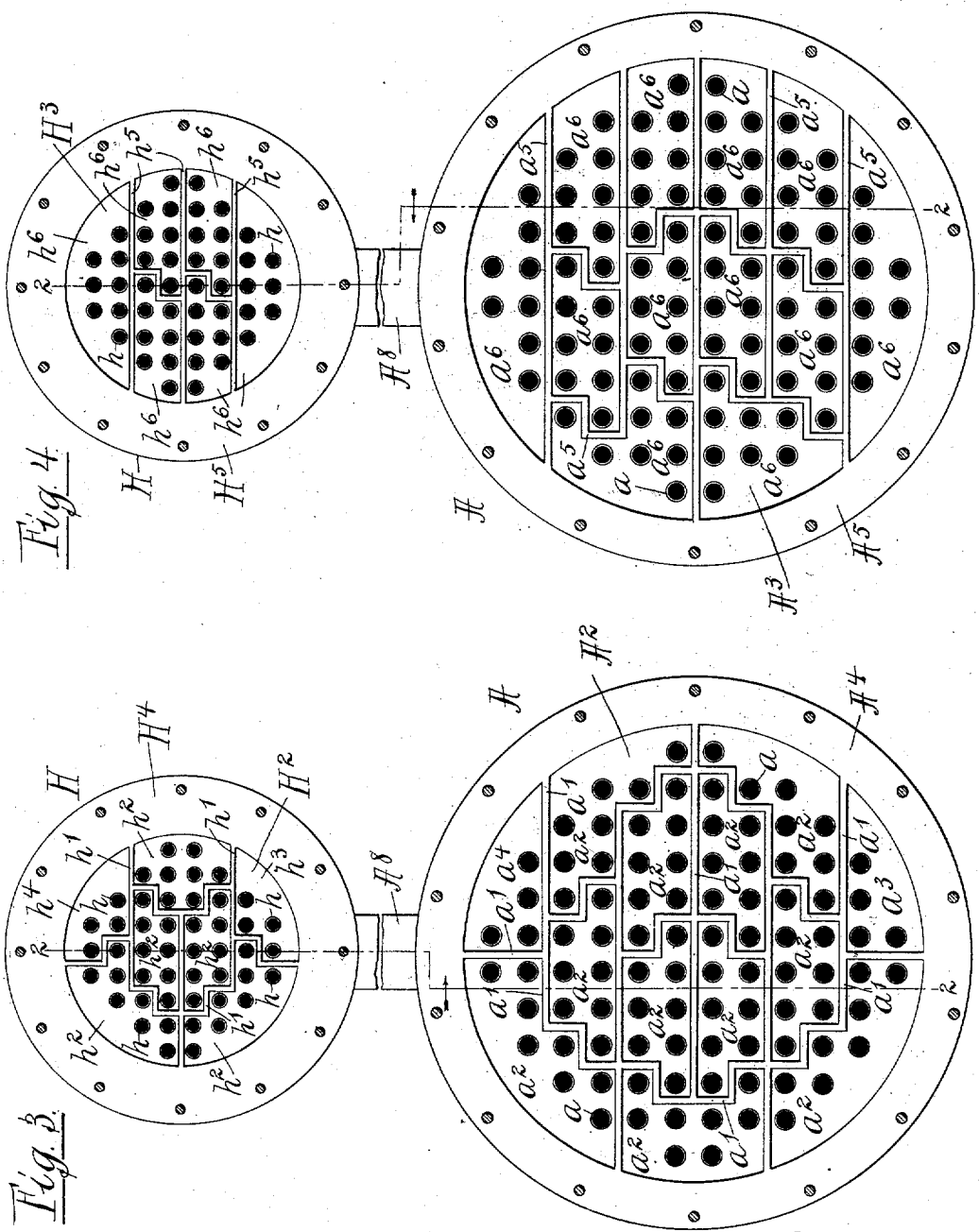

UNITED STATES PATENT OFFICE.

EUGENE W. DEMING, OF NEW ORLEANS, LOUISIANA.

PROCESS OF AND APPARATUS FOR DEFECATING SACCHARINE SOLUTIONS.

SPECIFICATION forming part of Letters Patent No. 531,460, dated December 25, 1894.

Application filed January 29, 1894. Serial No. 498,359. (No model.)

*To all whom it may concern:*

Be it known that I, EUGENE W. DEMING, of New Orleans, in the parish of Orleans and State of Louisiana, have invented certain new and useful Improvements in Processes of and Apparatus for Defecating Saccharine Solutions; and I do hereby declare that the following is a full, clear, and exact description thereof, reference being had to the accompanying drawings, and to the letters of reference marked thereon, which form a part of this specification.

This invention relates to improvements in processes of and apparatus for defecating or removing the impurities from saccharine solutions such as the juice of sugar cane and other sugar producing plants. In some pre-existing processes of the character referred to it has been customary to gradually raise the temperature of the solution, after it has been neutralized with lime or other suitable material, to a point considerably above that at which it boils in an open tank, by superheating in closed vessels under a pressure somewhat greater than that of the atmosphere; it having been discovered that thereby many impurities will become coagulated and may be at once removed, which, under the old open tank defecating process, make their appearance at various stages in the sugar making, and require repeated skimming of the sirup to remove them, entailing much loss of time and waste of material.

In my improved process the solution is also heated under pressure to about the same degree as in the operation mentioned, viz: from 230° to 270° Fahrenheit, according to the characteristics of the particular solution in hand, but instead of gradually raising its temperature to this point I provide for the heating of the solution very rapidly, having discovered that the more nearly instantaneously the heating takes place the more perfect and complete the coagulation of the deleterious matters. To this end, therefore, for practicing my improved method in one form, I have devised an apparatus similar in some respects to that shown in my previous Patent No. 479,250, dated July 19, 1892, in which the juice is heated in a closed tank through which a number of steam pipes are passed. In my improved apparatus, however, this arrangement is exactly reversed, the juice being forced through a number or coil of relatively small tubes located within a tank or inclosing shell through which and around the tubes live steam or other heated fluid or gas is circulated. By this construction the area of heating surface is so much greater relatively to the volume of liquid exposed thereto at any given moment, that the time required to raise the temperature of the solution to the desired degree is reduced to a minimum, with correspondingly better results in coagulating the impurities. As in the form of apparatus previously patented as stated, a constant stream of the solution is forced through the heater or digester, but owing to the relatively small cross section of the tube or tubes through which the solution is conducted its movement is very much more rapid, with an accompanying increase of friction which serves to prevent the formation of scums upon the surface exposed to the solution, and also in great measure prevents the formation of scale thereon. A uniform circulation of the solution also results, by reason of which the consecutive portions of the liquid leave the heater in the order in which they enter it, thus preventing the over exposure of any part, to its injury by the inversion of sugar, and darkening of the product.

Preferably, though not necessarily, the digester thus set forth is employed in connection with the absorber or cooler forming part of the apparatus of my previous patent referred to, by means of which the heated solution from the heater is passed around or through one or more of the conductors which serve to convey the solution to the defecator, whereby the entering or raw solution absorbs the surplus heat from the superheated solution, and secures a large saving in fuel.

To secure the precipitation and removal from the solution of the impurities coagulated by the heating of the same, and of any other deleterious substances held in suspension therein, various suitable practices of filtration or precipitation may be employed, but as a distinct and further improvement and for the purpose of accomplishing another step in my improved process the solution as it comes from the digester or from the absorber, when the latter is used, is discharged into an open tank of suitable dimensions within which the coagulated impurities gradually settle to the bottom, carrying with them any deleterious matter held in suspension in the solution, while the clear liquid flows off over the edge of the tank. As the impurities accumulate in the bottom of the tank they may be contemporaneously removed either by a pump or by gravity so that the operation of the settling tank and of the defecator as a whole will be continuous.

My invention will be fully understood from the following description of the construction and operation of one embodiment of my improved apparatus, taken in connection with the accompanying drawings, in which—

Figure 1 is a front end elevation of a heater or digester, a cooler or absorber, and a settling tank, the latter being shown in section constructed in accordance with my invention. Fig. 2 is a side elevation, partly in section, of the digester and absorber. Figs. 3 and 4 are front and rear elevations respectively of the digester and absorber with the outer heads removed to disclose the arrangement of the partitions and tubes within the same.

A designates a heating tank or digester comprising a cylindric shell $A'$ preferably made of iron or steel boiler plate, and herein shown supported upon metallic columns B and C. Said shell is provided with front and rear heads $A^2$ and $A^3$ between which a plurality of tubes $a$ of copper or other suitable material, extend lengthwise through the shell, their open ends tightly fitting suitable apertures provided in the heads to receive them. Bolted to the heads $A^2$ and $A^3$ are relatively shallow cylindric rings $A^4$ and $A^5$ respectively, the outer ends of which are closed by front and rear outer heads $A^6$ and $A^7$, thereby forming a chamber at each end of the tank separate from the main body thereof, and into which the tubes $a$ open. Said tubes $a$ are, in this instance, ninety-six in number and the chamber at the front of the tank is divided by partitions $a'$ into thirteen pockets, of which eleven pockets, designated $a^2$, are each in open communication with eight of the tubes $a$, while the other two pockets, designated $a^3$ and $a^4$ and located respectively at the bottom and top of the chamber, are each in communication with four of the tubes $a$. The chamber at the rear of the tank is, in a generally similar manner, divided by partitions $a^5$ into twelve pockets $a^6$ each in communication with eight of the tubes $a$. The pockets $a^5$ are staggered with relation to the front pockets $a^2$ $a^3$ and $a^4$, so that each of the rear pockets is in communication with two adjacent front pockets, four of its eight tubes opening into one and the other four into the other. Conversely each of the front pockets, except the pockets $a^3$ and $a^4$, which each have communication with but four tubes, is in communication with two adjacent rear pockets. Communication is therefore established between the two front pockets $a^3$ and $a^4$ through all of the other pockets $a^2$ and $a^6$ in turn, and through all the tubes $a$ in twenty-four successive groups of four tubes each. Pipes D and E communicating respectively with said pockets $a^3$ and $a^4$ serve to conduct the solution to and from the tank.

As herein shown steam is admitted within the shell A of the tank through a pipe F opening into its upper side and controlled by a suitable valve $F'$. The steam and water of condensation are discharged from the shell $A'$ through a pipe G leading off from the bottom thereof and controlled by a suitable valve $G'$.

H designates a cooler or absorber used in connection with the digester A, and in this instance mounted upon the latter by means of suitable metallic supports $A^8$. The general construction of the absorber is similar to that of the heater except that it is of smaller diameter and has fewer tubes. It comprises a cylindric disk shell $H'$ provided with longitudinal tubes $h$ and having chambers formed at its ends by means of front and rear inner heads $H^2$ and $H^3$, rings $H^4$ and $H^5$, and outer heads $H^6$ and $H^3$ respectively. The front chamber is divided by partitions $h'$ into seven pockets, of which five, designated $h^2$, are in communication with eight tubes each and two, designated $h^3$ and $h^4$, and located respectively at the bottom and top of the chamber, are in communication with four tubes each, said tubes being forty-eight in total number. The chamber at the rear end of the absorber is divided by partitions $h^5$ into six pockets $h^6$ in communication with eight tubes each, and staggered with relation to the front pockets so that each rear pocket is in communication with two adjacent front pockets, and conversely each front pocket, except the pockets $h^3$ and $h^4$, is in communication with two adjacent rear pockets.

The pipe E which conducts the solution off from the upper front pocket $a^4$ of the digester, as herein before described, charges into the lower front pocket $h^3$ of the absorber, and the pipe D which conducts the solution into the lower front pocket $a^3$ of the digester leads out of the shell $A'$ of the absorber at the lower front portion thereof. A suitable force pump (not shown) the discharge pipe I of which opens into the upper rear portion of the shell $H'$ serves to supply the cold solution to the apparatus, and in passing through the shell $H'$ to the outlet pipe D it will obviously absorb a portion of the heat units contained in the super-heated portion passing through the tubes $h$. The partially warmed solution passes out of the shell $H'$ through the pipe D into the lower front pocket $a^3$ of the digester, from which it circulates through the tubes $a$ and pockets $a^2$ and $a^6$ into the upper front pocket $a^4$, during which passage the solution is sufficiently super-heated to coagulate the impurities by the steam within the shell $A'$. Owing to the great number of the tubes $a$ and to their relatively small diameter, the heating takes place almost instantaneously with the most perfect result in coagulating the impurities. A very short exposure within the tubes is, therefore, sufficient, so that a high velocity of flow may be maintained, the friction of which prevents the accumulation of scum or scale in the passages. From the pocket $a^4$ the solution, now ladened with coagulated matter, is conducted by pipe E to the lower front pocket $h^3$ of the absorber, from which it circulates through the tubes $h$ and pockets $h^2$ and $h^6$ into the upper front pocket $h^4$, and out of the latter through a discharge pipe J. In its passage through the absorber, the super-heated solution gives up a portion of its heat units to the entering solution, as herein before stated, and thereby is cooled down, preferably, below its normal boiling point, so that after it is discharged from the absorber no ebullition, by which the precipitation of the impurities would be retarded, can occur.

A pressure regulator E' is herein shown provided in the pipe E, by means of which a constant pressure, greater than that of the atmosphere and corresponding with the degrees to which the super-heating is carried, is maintained upon the solution as it is forced through the digester by the pump (not shown) or otherwise; and the apparatus is provided with such suitable pressure gages, thermometers, cocks, valves, &c., (not shown) as may be found desirable for its convenient and successful operation.

It will be understood that the internal arrangement of the digester and absorber with the pockets at opposite ends connected by groups of tubes constitutes, in effect, substantially a coil of tubes, and in some instances, such a device might be employed, with similar results, in place of the present form, which latter, however, has the advantage of permitting the tubes to be readily cleaned by merely removing the outer heads. The exact number and size of tubes employed in the digester and absorber, and the number and arrangement of the pockets at the ends thereof are obviously matters of detail to be settled as the best practice may dictate. As herein shown, the tubes $a$ are made about one and one-half inches in diameter and the tubes $h$ about one inch in diameter, and obviously the solution traverses the length of the digester twenty-four times, and of the absorber twelve times, the rate of flow of the solution within the digester being, preferaby, about two or three feet per second.

The discharge pipe J, as herein shown, conducts the solution with its coagulated impurities to a settling tank K within which the impurities are precipitated. Said tank K, which is set forth and claimed in my concurrent application, Serial No. 499,616, filed February 9, 1894, comprises a cylindric upper portion K' provided with a conical or funnel shaped base $K^2$, converging downward to a central outlet pipe L. Supported centrally within the tank by means of braces $k$ and $k'$ is a vertical sheet metal pipe or down take $K^3$, open at both ends, and placed with its lower end some distance above the bottom of the tank, and with its upper end above the maximum level of the solution to be contained in the tank. Short outlet pipes $K^4$ extending through the wall of the tank near the top thereof permit the solution to flow out of the tank as fast as it is supplied thereto, and in this instance, said tubes are made of inverted U shape, in order that the outflow may be from a level slightly below the surface of the liquid, the drawing off of any scum which might accumulate on the surface being thereby avoided. A gutter $K^5$ is arranged around the exterior of the tank just below the outer ends of the pipes $K^4$, and is provided with an outlet $k^2$ from which the solution may be conducted off as desired. The tank is normally made of large dimension, in order that its contents may not be greatly agitated by the current of the solution poured into it. For example, the diameter of the body portion may be about nine feet, and of the down-take twelve inches, the maximum depth of the tank being equal to or greater than its diameter, with the upper end of the down-take about two feet above the outlet pipes $K^4$, and its lower end about six feet above the outlet in the bottom of the tank. Obviously, however, these dimensions may be varied widely without interfering with the successful operation of the device.

The pipe J leading off from the absorber discharges the solution into the open upper end of the down-take $K^3$ above the level of the liquid in the tank, so that any air or vapor mixed therewith is permitted to escape, while the solution itself flows slowly downward to enter the body of the tank. On leaving the down-take, the solution spreads out in all directions, and becomes so widely distributed that its current is scarcely perceptible. Through this body of comparatively still liquid the coagulated matters, already given a downward impulse by their passage through the down-take, settle to the bottom of the tank, and are directed by its conical shape toward the outlet pipe L thereof, it being well known that coagulated impurities of saccharine solutions when thoroughly beaten into the liquid thereof, are readily precipitated. As it settles to the bottom, the coagulated matter carries with it any other deleterious substances held in suspension in the solution, while the clear liquid rises slowly to the top of the tank and flows out through the pipes $K^4$. As an additional precaution toward insuring the complete clarification of the solution as discharged, a filter screen $K^6$ is herein shown provided across the body of the tank just below the pipes $K^4$, the accumulations on the under side of which gather in the form of flakes that ultimately break off and settle to the bottom, whereby the screen is self cleaning in its action.

As fast as the precipitate accumulates in the bottom of the tank it is conducted off to the filters or filter presses through the pipe L, such removal being readily accomplished simultaneously with the flow of the solution through the tank, and without interfering with normal operation. The entire process as carried on by the whole apparatus is, therefore, continuous, the solution, in its raw state, being constantly forced in through the pipe J, and drawn off at the outlet $k^2$, completely defecated and clarified.

My improved process and apparatus thus described is attended by numerous and very important advantages among which may be mentioned the following: The entire clarifying action is accomplished in a single complete apparatus which is under the easy and complete control of a single operator. The action of the apparatus is continuous and entirely automatic and the use of open clarifiers, even for settling tanks, is entirely dispensed with. Only the precipitate or mud and very little juice is filtered, thereby increasing the filter capacity by a third, and the temperature of the matter coming from the settling tank is always about 200° Fahrenheit, at which the filtering operation may be carried on to the best advantage. No scum tanks or scum blow-ups are required while the impurities, which coagulate in large, heavy particles, are so concentrated as to increase the dry filter press cake fifty degrees by weight. The solution when settled is practically of one grade, and experience has shown that one-third less time is sufficient to secure a neutral solution. By this process also the gums are completely destroyed and consequently cannot interfere with the filter or vacuum pan work, and cannot clog the centrifugals, thus greatly increasing their capacity; and finally, the apparatus is practically self-cleaning and is capable of clarifying an entire crop without scraping or the use of acids, and without requiring the process to be discontinued from the beginning to the end of the run.

I claim as my invention—

1. The process of defecating saccharine solutions, which consists in rapidly superheating the solution under a pressure above that of the atmosphere by forcing it through relatively small passages within a heating medium at a high velocity, and then separating the coagulated impurities from the clear liquid, substantially as described.

2. The process of defecating saccharine solutions, which consists in rapidly superheating the solution under a pressure above that of the atmosphere by forcing the solution through relatively small passages within a heating medium at a high velocity, continuously discharging the solution into a tank, permitting the clear liquid to flow off at the top of the tank and contemporaneously removing the precipitated impurities from the bottom of the tank, substantially as described.

3. In an apparatus for defecating saccharine solutions, the combination with a heating tank or digester having a plurality of small tubes forming a conductor for the solution, and a surrounding shell adapted to contain a heating fluid, of an absorber or cooler having a plurality of tubes and a surrounding shell, an inlet in said absorber shell for the admission of the solution, connections between said absorber shell and one end of the digester tubes and between the other end of the digester tubes and one end of the absorber tubes, and an outlet for the solution at the other end of the absorber tubes, substantially as described.

4. In an apparatus for defecating saccharine solutions, the combination, with a heating tank or digester having a plurality of small tubes forming a conductor for the solution, and a surrounding shell adapted to contain a heating fluid, of an absorber or cooler having a plurality of tubes and a surrounding shell, an inlet in said absorber shell for the admission of the solution, connections between said absorber shell and one end of the digester tubes and between the other end of the digester tubes and one end of the absorber tubes, and an outlet for the solution at the other end of the absorber tubes, and a settling tank provided with a downwardly turned inlet between the bottom and the top of the tank, an outlet for the precipitated impurities at the bottom of the tank, and a pipe leading from the discharge end of the absorber tubes into said tank inlet, substantially as described.

5. In an apparatus for defecating saccharine solutions, the combination, with a heating tank or digester having a plurality of small tubes forming a conductor for the solution, and a surrounding shell adapted to contain a heating fluid, of an absorber or cooler having a plurality of tubes and a surrounding shell, an inlet in said absorber shell for the admission of the solution, connections between said absorber shell and one end of the digester tubes and between the other end of the digester tubes and one end of the absorber tubes, an outlet for the solution at the other end of the absorber tubes, and a settling tank having a conical bottom provided at its lower end with an outlet for the precipitated impurities, an open-ended downtake terminating between the top and bottom of the tank, a pipe leading from the discharge end of the absorber tubes to the downtake, and means for drawing off the clear liquid at the top of the tank, substantially as described.

In testimony that I claim the foregoing as my invention I affix my signature in presence of two witnesses.

EUGENE W. DEMING.

Witnesses:
CARLETON HUNT,
CHAUNCEY S. KELLOGG.